F. O. KUEHNE, Jr., AND J. KRAMER.
POWER TRUCK.
APPLICATION FILED DEC. 24, 1920.
1,405,137.
Patented Jan. 31, 1922.
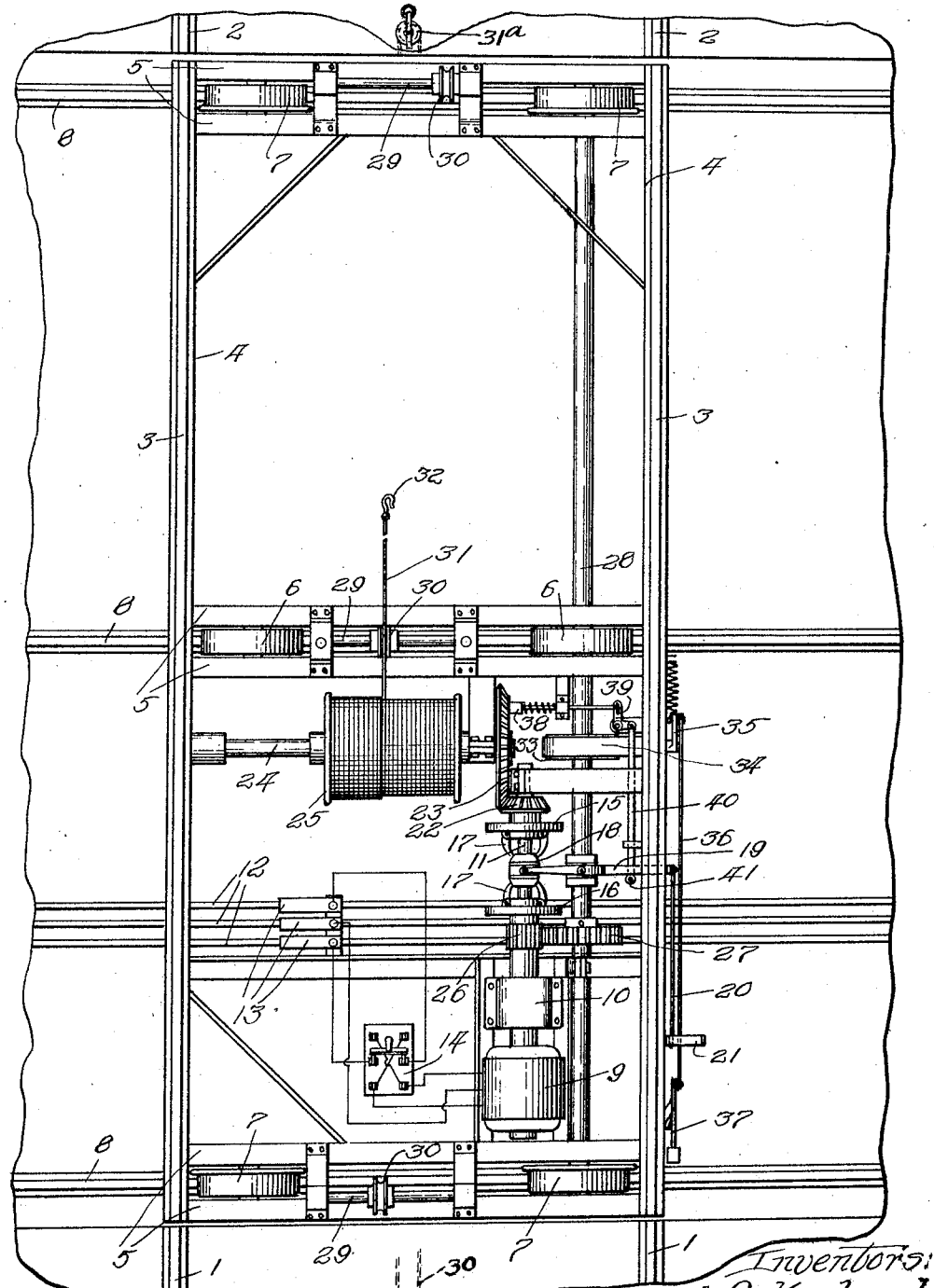

UNITED STATES PATENT OFFICE.

FRED O. KUEHNE, JR., AND JULIUS KRAMER, OF CHICAGO, ILLINOIS, ASSIGNORS TO PULLMAN DAVENPORT & UPHOLSTERED FURNITURE COMPANY, OF CHICAGO, ILLINOIS, A CORPORATION OF ILLINOIS.

POWER TRUCK.

1,405,137.     Specification of Letters Patent.     Patented Jan. 31, 1922.

Application filed December 24, 1920. Serial No. 433,017.

*To all whom it may concern:*

Be it known that we, FRED O. KUEHNE, Jr., and JULIUS KRAMER, both citizens of the United States, residing at Chicago, in the county of Cook and State of Illinois, have invented certain new and useful Improvements in a Power Truck, of which the following is a specification.

This invention relates particularly to a truck for moving loads of lumber, or other material, from one position to another and has for its principal object to simplify and facilitate the movement of loaded trucks to and from the motor truck and for bodily transporting such trucks with the motor truck itself.

Among the other objects of the invention are: to provide means for automatically braking the winding drum each time the driving power engagement therewith is cut off; to provide means for braking the movement of the motor truck in either direction regardless of the driving engagement or movement thereof in either direction; to operate either the winding drum or the driving shaft for propelling the truck in either direction at will; and in general, to produce the improved construction, combination and arrangement of the parts as herein shown and described.

The accompanying drawing shows a plan view of a power truck constructed in accordance with the principles of this invention.

This invention is particularly designed and intended for transporting truck loads of lumber, or the like, from an outside or loading yard by means of the power truck, to a drier, or the like, and from the drier to a cooling or tempering chamber. In order to facilitate this movement the loading trucks are mounted on tracks 1 and 2 at opposite sides of the power truck which coincide in width with rails 3 extending lengthwise of the power truck itself. The loaded trucks are wheeled on to the rails 3 of the power truck which is then moved bodily with the loaded truck thereon to some other position in which the rails 3 coincide with rails 1 or 2 on either side of the power truck, so that the wheeled truck can be removed therefrom at any desired location such for example, as a drier on one side of the power truck and a cooling chamber on the other side of the power truck. It is obvious that the drier and the cooling chamber may be opposite each other, they may be on the same side of the power truck or they may be on opposite sides some distance apart.

The truck itself comprises a frame with longitudinally extending beams 4 connected at the center and ends by cross beams 5 in which are mounted supporting wheels 6 and 7 which run on the rails 8 extending transversely of the power truck. It is obvious that the shape of the track and the disposition of the rails 3 thereof are immaterial; the truck may be wide enough for a number of tracks 3.

Mounted at one end of the power truck is an electric motor 9 which is connected through a reduction gear 10 to a jack shaft 11. The motor may be of any suitable type, and as shown, preferably receives its current supply from contact rails 12 by means of brushes 13 carried on the truck frame and through a reversing switch 14 which is movable from a neutral position to make connections for operating the motor in either direction.

Mounted upon the jack shaft 11 are two friction clutch members 15 and 16 each having arms 17 for engagement with a collar 18 between them on the shaft 11, so that the movement of the collar in either direction by means of a lever 19 will connect either the friction clutch member 15 or the other member 16 for driving engagement with the shaft 11. This lever 19 is connected by means of a rod 20 with a shifting lever 21 which is usually placed at the end of the truck adjacent the motor 9 and convenient to the reversing switch 14.

One of the clutch members 15 has a bevel pinion 22 which engages a bevel gear 23 mounted upon a shaft 24 upon which a winding drum 25 is also mounted. The other friction clutch member 16 has a pinion 26 which engages with a gear 27 mounted on a driving shaft 28 which preferably has three supporting wheels 6 and 7, at one side of the truck mounted thereon. In operation, it is obvious that the drum 25 or the driving shaft 28 can be operated independently in either direction by the movement of the shift lever 21 and by the movement of the reversing switch 14.

Mounted upon the central and end cross pieces 5 are short shafts 29 upon each of which a single grooved pulley 30 is freely movable. The drum 25 carries a cable 31 which is wound thereon or unwound therefrom depending upon the direction of the movement of the drum, and a hook 32 is commonly provided at the end of the cable for engaging the loaded trucks which are drawn upon the power truck from the side tracks 1 and 2. When it is desired to pull the loaded truck upon the power truck, the hook 32 of the cable is connected to the far end of the loaded truck which can then be drawn entirely upon the power truck by the operation of the motor 9. In withdrawing the loaded truck from the power truck, the cable 31 is passed over a pulley 31$^a$ at the far end of the tracks 1 or 2, and is then connected to the loaded truck on the power truck, the operation of the motor 9 thereupon drawing off the loaded truck in a well known manner. In either of these operations, the cable 31 will be wound or unwound from the drum 35, and if laid in the groove of one or some of the pulleys 30, the movement of the cable is free from frictional engagement.

In order to stop or retard the movement of the power truck in either direction, a pulley 33 is mounted on the driving shaft 28, and a normally free clutch band 34 is operated in any well known manner to engage the pulley when it is desired. The operating means includes a spring pressed arm 35 connected by a rod 36 to a pedal 37 disposed adjacent the shift lever 31.

It is also desirable that a brake be provided for the drum 25 which will be in operation only when the drum is at rest. For this purpose a spring pressed brake member 38 is mounted to bear against the bevel gear 23 but can be withdrawn therefrom by means of a bell crank 39 and a connecting member 40 which extends beyond the lever 19 and has a projection 41 which is engaged only by the lever when the lever is moved in a direction to connect the friction driving element 15 which operates the drum, with the shaft 11. In the other direction of movement the member 40 is not moved. Thus it is obvious, that whenever the shift lever 21 is brought back to neutral position after being moved to operate the drum, the brake member 38 will be applied to the gear 23 to retard and stop the movement of the drum.

With this construction it is obvious that loaded trucks can be moved and transported in any desired manner, the cable may be used for drawing them from a distance or withdrawing them from the power truck itself; the power truck may be operated in either direction and its movement may be controlled by the brake whether the motor is in operation or not; there is no danger that the cable will become tangled or unwound because of any uncontrolled movement of the winding drum 25, and although the current supply rails are shown as being between the tracks 8 for the power truck it is obvious that they may be at the side of the pit in which such a truck is usually operated, or they may be overhead wires, or there may be a fixed connection to the reversing switch through a trailing cable.

A hand operated power element such as a crank or a ratchet mechanism may replace the electric motor. It is obvious that other changes may be made in the construction, combination and arrangement of the several parts without departing from the spirit and scope of this invention.

We claim:

1. In a power truck, the combination with a reversible motor and a driving shaft operated thereby, of a winding drum, a driving shaft for moving the truck, and means including a pair of clutch members and a single operating lever therefor to connect either the truck driving shaft or the winding drum to the motor driving shaft.

2. In a self contained power truck of unitary character, a reversible motor and a shaft driven thereby, in combination with a winding drum, a driving shaft for the truck, means for connecting either the winding drum or the truck driving shaft with the motor shaft, and braking means separately operable for retarding the truck driving shaft and the winding drum, the drum brake being operatively connected to the drum and motor shaft-connecting means to render said brake and drum alternately effective.

3. In a lumber handling system, a dry-kiln having a series of parallel tracks, a transfer track disposed crosswise of said tracks, and other tracks disposed crosswise of the transfer track, in combination with a transfer truck to travel on said transfer track, and a plurality of lumber-bunk-trucks to travel on said transfer truck and on the said parallel tracks and the said other tracks.

4. In a motor truck, a track extending transversely of the direction of movement of the truck, a winding drum having its axis extending transversely of the track, a driving motor for the truck and the drum, a cable adapted to be wound upon the drum, and a plurality of supports for the cable, said supports each comprising a short bar extending parallel with the drum axis, and a pulley mounted for free longitudinal and rotary movement on the bar, and having a groove adapted to seat the cable therein for lessening the friction of the cable.

5. In a power truck, a reversible driving shaft, a winding drum, a power shaft for operating the truck, means for connecting either the winding drum or the truck operating shaft to the driving shaft, said means comprising a pair of frictional engaging means mounted upon the driving shaft and connecting one to the winding drum and the other to the truck driving shaft, and a lever operated clutching member between the two frictional engaging means movable in opposite directions from a neutral position to engage one or the other of them.

6. In a power truck of the class described, a reversible power shaft, a truck driving shaft, a winding drum, means for connecting the winding drum or the truck driving shaft to the power shaft, said means comprising a lever movable in one direction from a central position for causing the engagement of the winding drum with the power shaft, and in the other direction from the central position for causing the engagement of the driving shaft with the power shaft, and a brake which normally holds the winding drum against rotation in either direction with operating means therefor which is released when the said operating lever is moved in a direction to cause the engagement of the winding drum with the power shaft.

7. In a power truck, a reversible power shaft, a truck driving shaft, a winding drum, a brake for the truck driving shaft, a brake for normally holding the winding drum in fixed position, means for connecting either the winding drum or the truck driving shaft to the power shaft, said means including a lever operable in opposite directions from a central position, and including a connection for releasing the winding drum brake when the lever is moved in a direction to connect the power shaft with the winding drum.

8. In a power truck, a reversible motor and a shaft driven thereby, a truck driving shaft and means for braking it in either direction, a winding drum having its axis at right angles to the truck driving shaft, two frictional clutch members mounted on the motor shaft, and connected one to the truck driving shaft and the other to the winding drum, the clutch members including operating arms extending toward each other, a collar movable on the motor shaft for engaging the arms of one clutch member or the other, a lever for moving the collar in either direction from a neutral position, a spring pressed brake for normally holding the winding drum in any position, and means for releasing this brake only when the said operating lever is moved in one direction from its neutral position, the brake remaining in engagement when the lever is returned to neutral or is moved in the opposite direction therefrom.

9. A self-contained and unitary truck carrying a track which extends transversely of the direction of movement of said truck, a motor mounted on said truck and mechanisms operated by said motor for propelling a wheeled load on said track and for propelling said truck respectively.

10. The combination with a truck having a track carried thereby, of a motor and mechanisms operated by the motor for propelling a wheeled load along said track and for bodily moving the truck with said load, the motor and the propelling means being below the plane of the track.

11. In a material handling system, a self-contained power operated transfer truck having a railway track thereon to receive lumber-bunk-trucks, which may be heavily loaded, said truck having a motor, means operable by power from said motor to move said bunk-trucks along said track for loading and unloading the transfer truck, supporting wheels arranged for carrying the truck transversely of the direction of its said track, and means to transmit tractive power from said motor to said wheels.

FRED O. KUEHNE, Jr.
JULIUS KRAMER.